United States Patent
Tamagawa

(10) Patent No.: US 11,130,051 B2
(45) Date of Patent: Sep. 28, 2021

(54) SERVER DEVICE, AND STORAGE MEDIUM USED IN SAME

(71) Applicant: KONAMI DIGITAL ENTERTAINMENT CO., LTD., Tokyo (JP)

(72) Inventor: Mitsuru Tamagawa, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 60 days.

(21) Appl. No.: 16/662,237

(22) Filed: Oct. 24, 2019

(65) Prior Publication Data

US 2020/0054943 A1 Feb. 20, 2020

Related U.S. Application Data

(63) Continuation of application No. PCT/JP2018/016209, filed on Apr. 19, 2018.

(30) Foreign Application Priority Data

Apr. 28, 2017 (JP) .............................. JP2017-090024

(51) Int. Cl.
 *A63F 13/86* (2014.01)
 *A63F 13/30* (2014.01)
 (Continued)

(52) U.S. Cl.
 CPC .............. *A63F 13/30* (2014.09); *A63F 13/40* (2014.09); *A63F 13/497* (2014.09); *A63F 13/79* (2014.09); *A63F 13/86* (2014.09)

(58) Field of Classification Search
 CPC ....................................................... A63F 13/86
 See application file for complete search history.

(56) References Cited

U.S. PATENT DOCUMENTS

2007/0294089 A1* 12/2007 Garbow ............. G06Q 30/0216
 705/26.1
2012/0309543 A1* 12/2012 Shimada ................. A63F 13/67
 463/42

(Continued)

FOREIGN PATENT DOCUMENTS

| JP | 2002-236778 A | 8/2002 |
| JP | 2012-245225 A | 12/2012 |
| JP | 2015-142207 A | 8/2015 |

OTHER PUBLICATIONS

International Search Report dated May 22, 2018, in International Application No. PCT/JP2018/016209.

(Continued)

*Primary Examiner* — Jay Trent Liddle
(74) *Attorney, Agent, or Firm* — Sughrue Mion, PLLC

(57) ABSTRACT

Provided is a server device that is capable of reflecting a game activity track record in evaluation results of a game video. A center server is connected via a network to a user terminal that displays videos and manages evaluation results of each user when the videos are evaluated by the users. In addition, if a game video related to a game provided by the user terminal is displayed on the user terminal, the center server stores play data described so as to associate a user ID with information on the presence or absence of each user's play track record of the game. The center server classifies the evaluation results, on the basis of the information on the presence or absence of a play track record, into mutually separate special evaluation results and general evaluation results, and provides the evaluation results so as to include the special evaluation results.

7 Claims, 8 Drawing Sheets

(51) Int. Cl.
*A63F 13/40* (2014.01)
*A63F 13/497* (2014.01)
*A63F 13/79* (2014.01)

(56) References Cited

U.S. PATENT DOCUMENTS

2014/0243097 A1* 8/2014 Yong .................. G06Q 30/0209
                                                           463/42
2014/0243098 A1* 8/2014 Yong ...................... G06Q 10/10
                                                           463/42
2017/0182426 A1* 6/2017 Loeb ....................... A63F 13/30

OTHER PUBLICATIONS

Written Opinion of the International Searching Authority dated May 22, 2018 fin International Application No. PCT/JP2018/016209.
Notice of Reasons for Refusal dated Sep. 11, 2017, from the Japanese Patent Office in application No. 2017-090024.
Decision to Grant a Patent dated Nov. 27, 2017, from the Japanese Patent Office in application No. 2017-090024.
Communication dated Apr. 5, 2021, issued by the Korean Intellectual Property Office in application No. 10-2019-7031417.

* cited by examiner

SERVER DEVICE, AND STORAGE MEDIUM USED IN SAME

TECHNICAL FIELD

The present invention relates to a server device and so on, to which video display terminals that display videos on the basis of video data are connected via a network, and that, when videos are evaluated by users via the video display terminals, manages results of evaluations by the users.

BACKGROUND ART

A server device exists to which video display terminals that display videos on the basis of video data are connected via a network, and that, when videos are evaluated by users via the video display terminals, manages results of evaluations by the users. For example a video delivery system is known (for example, refer to PTL1) that employs program contents as videos, and that determines and records evaluations by viewers relating to the program contents on the basis of images of the viewers who are viewing the program contents.

CITATION LIST

Patent Literature

PTL1: JP2015-142207A.

SUMMARY OF INVENTION

Technical Problem

With the system of PTL1, evaluations of users relating to videos are managed, but there is no mention relating to game videos. Due to this, the game activity track records corresponding to game videos of this type are not employed in evaluation of the videos, and are not managed either.

Accordingly, an object of the present invention is to provide a server device and so on, capable of reflecting game activity track records in the evaluation results for game videos.

Solution to Technical Problem

The server device of the present invention is a server device that comprises a computer to which video display terminals that display videos on the basis of video data (18) are connected via a network, and that, when videos are evaluated by users via the video display terminals, manages results of evaluations by the users, wherein the computer serves as: an activity data storage unit that, when a game video associated with a game supplied by a game terminal connected via the network is displayed upon a video display terminal on the basis of the video data, stores activity data in which are described, in mutual association, information about activity track records related to users in that game, and user identification information for identifying the users; a result classification unit that, on the basis of the activity track record information in the activity data, classifies the results of evaluations by the users into a plurality of categories that include one partial category and another category, so that special evaluation results that correspond to evaluation results belonging to the one partial category are distinguished from other evaluation results that correspond to evaluation results belonging to the other category; and a result provision unit that provides evaluation results to the users on the basis of results of classification by the result classification unit, so as to include the special evaluation results.

On the other hand, a non-transitory computer readable storage medium of the present invention is a non-transitory computer readable storage medium storing a computer program that is adapted to cause the computer having the activity data storage unit to function as the units of the server device described above.

DESCRIPTION OF EMBODIMENTS

Figure 1:
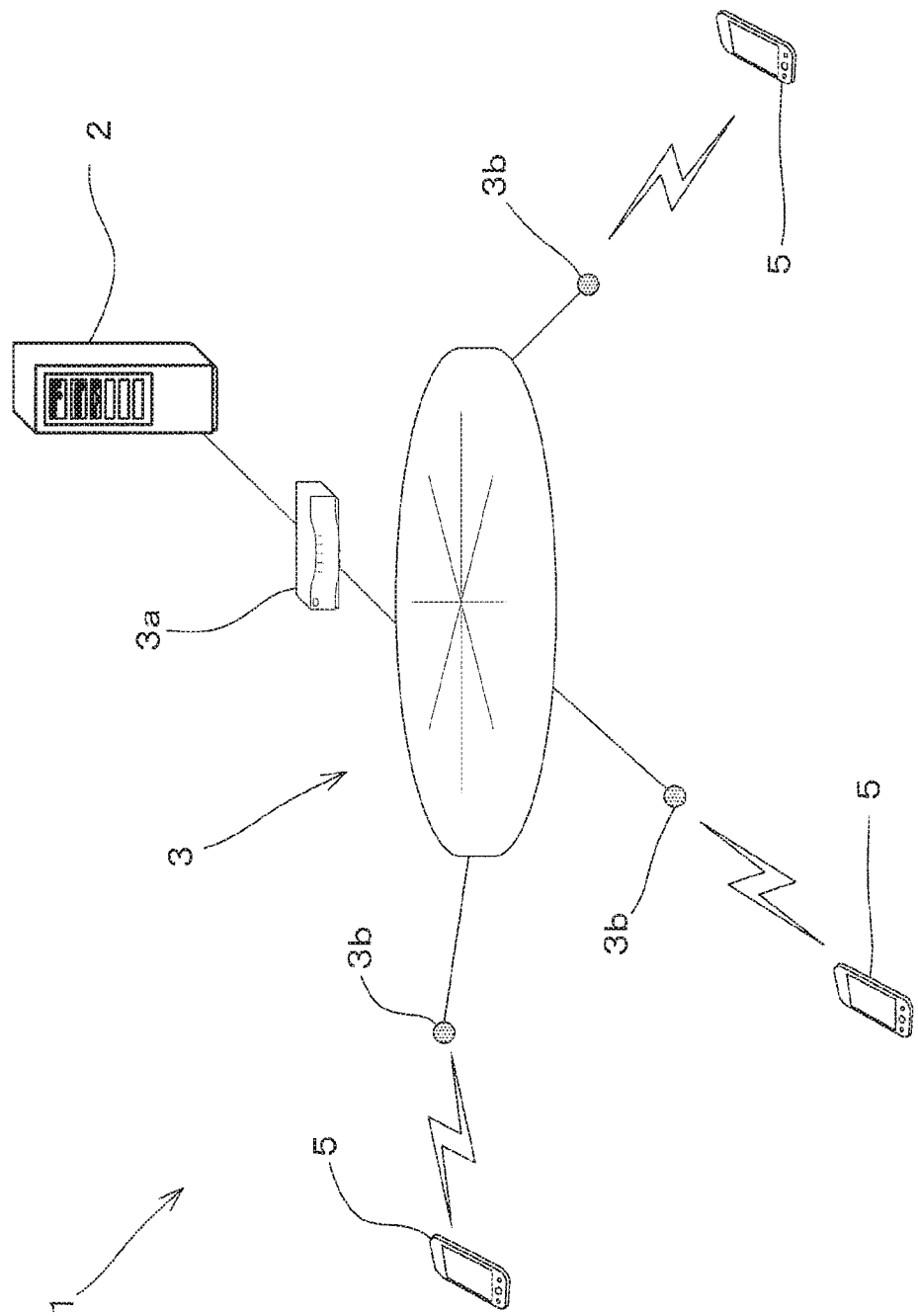
FIG. 1 is a figure showing a summary of the overall structure of a video delivery system according to an embodiment of the present invention.

In the following, a video delivery system according to an embodiment of the present invention will be explained. FIG. 1 is a figure showing a summary of the overall structure of a video delivery system according to an embodiment of the present invention. As shown in FIG. 1, the video delivery system 1 includes a center server 2, which operates as a server device. The center server 2 is not limited to this example in which it consists of a single physical device. For example, a server group consisting of a plurality of physical devices may constitute a single logical center server 2. Moreover, the center server 2 could also be constructed logically by employing cloud computing.

User terminals 5 are connected to the center server 2 via a network 3. The user terminals 5 are network terminal devices of types that are employed by users. For example, a portable telephone (including a smartphone) may be employed as a user terminal 5. A portable telephone is a type of user terminal that is provided for the individual personal use of a user. For example, a portable telephone may have a video replay function of displaying (i.e. of replaying) video. And a portable telephone may, for example, function as a video display terminal for displaying video via this type of video replay function. Moreover, a portable telephone may provide various other functions by executing software. For example, one such function may be a game machine function that enables the user to play a game. And a portable telephone may, for example, function as a game terminal that provides a game via a game machine function of this type. In other words, the user terminal 5 may, for example, function both as a video display terminal and as a game terminal. Incidentally, apart from the above, for example, network terminal devices of various types such as personal computers and portable type tablet terminal devices that can be connected to a network and that are provided for individual personal use of users may be employed as user terminals 5.

As one example, the network 3 may be configured to implement network communication by employing the TCP/IP protocol. Typically, the network 3 is built as a combination of the internet that serves as a WAN and an intranet that serves as a LAN. In the example of FIG. 1, the center server 2 is connected to the network 3 via a router 3a, and the user terminals 5 are connected to the network 3 via access points 3b.

Incidentally, the network 3 is not limited to a format that employs the TCP/IP protocol. Formats of various types may be employed for the network 3, such as cabled communication circuits, wireless circuits (such as infrared communication or Near Field Communication, etc.), and so on.

Via the network 3, the center server 2 provides web services of various types to the users of the user terminals 5. A video delivery service for delivering videos to the user terminals 5 is included in the web services. Furthermore, a video evaluation service of accepting evaluations of videos delivered via the video delivery service is included in the web services. For example, the video evaluation service may be supplied as part of the video delivery service. The details of the video evaluation service will be described hereinafter.

Incidentally, apart from the above, according to the functions of the user terminals 5, the web service may include other services of various types. For example, the web service may include an information service of providing information of various types related to videos or to games. Moreover, for example, the web service may also include a distribution service of distributing data or software of various types to the user terminals 5 (including data updates and so on). Yet further, the web service may also include a community service of providing a forum for transmission, exchange, sharing and so on of information by users, a service of assigning user IDs for identifying users, a matching service of matching between users when a plurality of users are playing a common game via the network 3, and so on.

Figure 2:
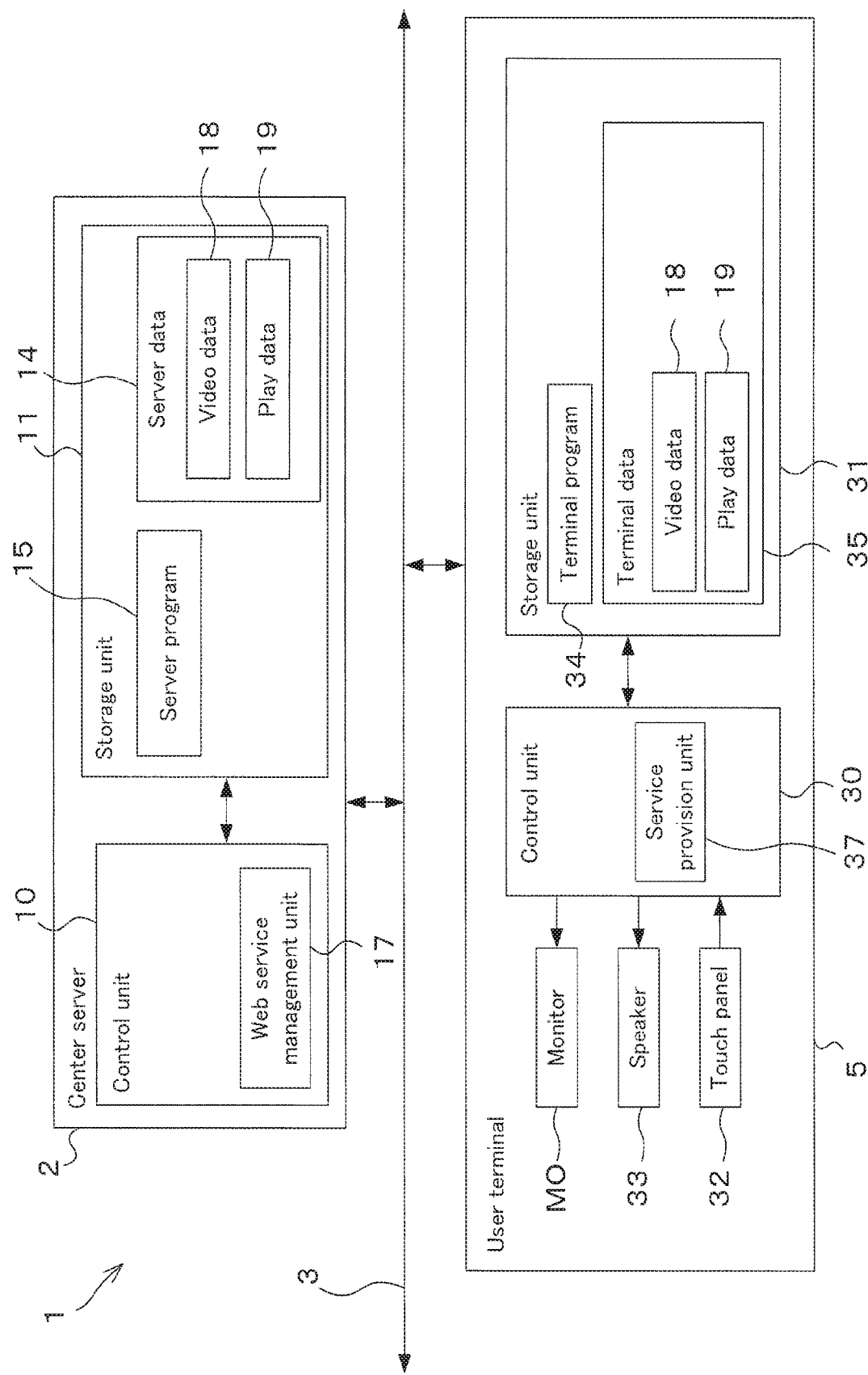
FIG. 2 is a figure showing the structure of principal portions of a control system of the video delivery system.

Next, principal portions of a control system of the video delivery system 1 will be explained. FIG. 2 is a figure showing the structure of principal portions of the control system of the video delivery system 1. As shown in FIG. 2, the center server 2 includes a control unit 10 which serves as a computer, and a storage unit 11. The control unit 10 is built as a computer unit in which are combined a microprocessor and peripheral devices of various types required for the operation of the microprocessor, such as internal storage devices (for example, a ROM and a RAM) and so on. Incidentally, input devices such as a keyboard and so on, and output devices such as a monitor and so on, may be connected to the control unit 10. However, these are omitted from the figures.

The storage unit 11 is connected to the control unit 10. The storage unit 11 may be built so as to be capable of maintaining storage even if power is not supplied; for example, it may be built around a high capacity storage medium such as a magnetic tape or the like. Server data 14 and a server program 15 are stored in the storage unit 11. The server program 15 is a computer program that is required by the center server 2 for supplying services of various types to the user terminals 5. A web service management unit 17 is provided internally to the control unit 10 by the control unit 10 reading in and executing the server program 15.

The web service management unit 17 performs processing that is required for providing the web service mentioned above. The web service management unit 17 is a logical device that is implemented by a combination of computer hardware and a computer program. Incidentally, apart from the above, various other types of logical device may be provided internally to the control unit 10. However, such other devices are omitted from the figures.

The server data 14 is data that is referred to during execution of the server program 15. For example, the server data 14 may include video data 18 and play data 19, which serves as activity data. The video data 18 is data for displaying videos of various types. For example, a video associated with a game may be included in these videos. In more concrete terms, for example, the video data 18 may include data for displaying, as videos, transitions of the game screen during playing in the past of a game provided by the user terminal 5 (in the following, these are sometimes termed "game videos"). And the play data 19 is data for managing unique information that is intrinsic to each of the users. For example, this type of unique information may include information about the activity track records of each user in relation to the game. And, for example, the play data 19 may be employed for handing over the play results up to and including the last playing episode (i.e. the state of play in the past) to the next and subsequent playing episodes, or for handing over setting details that are unique to each user. The details of the video data 18 and the play data 19 will be described hereinafter.

Incidentally, for example, apart from the above, the server data 14 may include data of various types for web services, such as ID management data for managing IDs of various types such as user IDs and so on. However, such data is omitted from the figures.

On the other hand, each of the user terminals 5 is provided with a control unit 30, a storage unit 31, a monitor MO, a touch panel 32, and a speaker 33. The storage unit 31, the monitor MO, the touch panel 32, and the speaker 33 are all connected to the control unit 30. The control unit 30 is constructed as a computer unit in which a microprocessor and various peripheral devices such as internal storage devices (for example ROM and RAM) and so on that are required for the operation of the microprocessor are combined. Incidentally, apart from the above, for example, devices of various types that are required for replaying videos or providing games may be connected to the control unit 30. However, these are omitted from the figures.

The monitor MO is a conventionally known display device for displaying images of various types and so on based upon output signals from the control unit 30. As one example, according to output signals from the control unit 30, the monitor MO may display videos and game screens for playing games. The touch panel 32 is a conventionally known input device that, when the user touches it by finger or the like, outputs a signal corresponding to the position where it is being contacted. The touch panel 32 may, for example, be built to be transparent, and may be disposed so as to be superimposed upon the front surface of the monitor MO. And then, on the basis of touch operation by the user, the touch panel 32 outputs a signal corresponding to the position where it is being touched to the control unit 30. In a similar manner, the speaker 33 is a conventionally known output device (i.e. an audio reproduction device) for reproducing audio of various types on the basis of output signals from the control unit 30. The speaker 33 reproduces audio of various types employed in videos or games, such as BGM (background music) and so on, according to output signals from the control unit 30.

On the other hand, the storage unit 31 may be built so as to be capable of maintaining storage even when power is not being supplied; for example, it may be built around a magnetic recording medium, an optical recording medium, a flash SSD (Solid State Drive), or the like. A terminal program 34 and terminal data 35 are stored in the storage unit 31. The terminal program 34 is a computer program that is required by the user terminal 5 for providing services of various types. For example, services of this sort may include replaying of videos and provision of games. As the control unit 30 executes the terminal program 34, a service provision unit 37 is thereby provided internally to the control unit 30. The service provision unit 37 executes processing of various types required for provision of services such as replaying of videos, playing of games, and so on. The service provision unit 37 is a logical device that is implemented by a combination of computer hardware and a computer program. Incidentally, apart from the above, various logical devices of other types may be provided internally to the control unit 30. However, such other devices are omitted from the figures.

The terminal data 35 is data that is referred to as the terminal program 34 is executed. For example, the terminal data 35 may include video data 18 and play data 19. And, for example, at least parts of this data may be supplied from the center server 2, so as to include necessary portions thereof. Incidentally, apart from the above, the terminal data 35 may include data of various types for executing services of various types. For example, audio data for replaying audio of various types such as BGM (background music) or the like required for videos or for games, image data for displaying images of various types required for games, and ID management data such as described above, may be included in data of this type. However, such other data is omitted from the figures.

Next, the details of the video evaluation service provided by the video delivery system 1 will be explained. As described above, the video evaluation service is a service of accepting evaluations of videos that are subjects of delivery. Moreover, the video evaluation service is capable of providing the users with the evaluation results of videos that have thus been accepted. Furthermore, the video evaluation service classifies the evaluation results of this type into a plurality of categories on the basis of a classification condition, and provides the evaluation results for each category so that they are mutually distinguished from one another. In concrete terms, for example, the video evaluation service may provide to each user evaluation results in categories of this type by extracting only one partial category, so that this one partial category and another category can be distinguished from one another. Or, by performing editing so that the worths of the evaluation results belonging to the one partial category are higher than the worths of the evaluation results belonging to the other category, the video evaluation service may provide the evaluation results so that the evaluation results belonging to the one partial category can be distinguished from the evaluation results belonging to the other category. In other words, the video evaluation service may provide the evaluation results for each video, so that more emphasis is accorded to the worths of the evaluation results belonging to the one partial category than to the worths of the evaluation results belonging to the other category. Furthermore, worths of this type may be provided so that it is possible to identify the one partial category and the other category; or, totaled results may be provided as the worths of this type when they can be added together, such as a case that the worths are expressed numerically, or the like.

Figure 3:
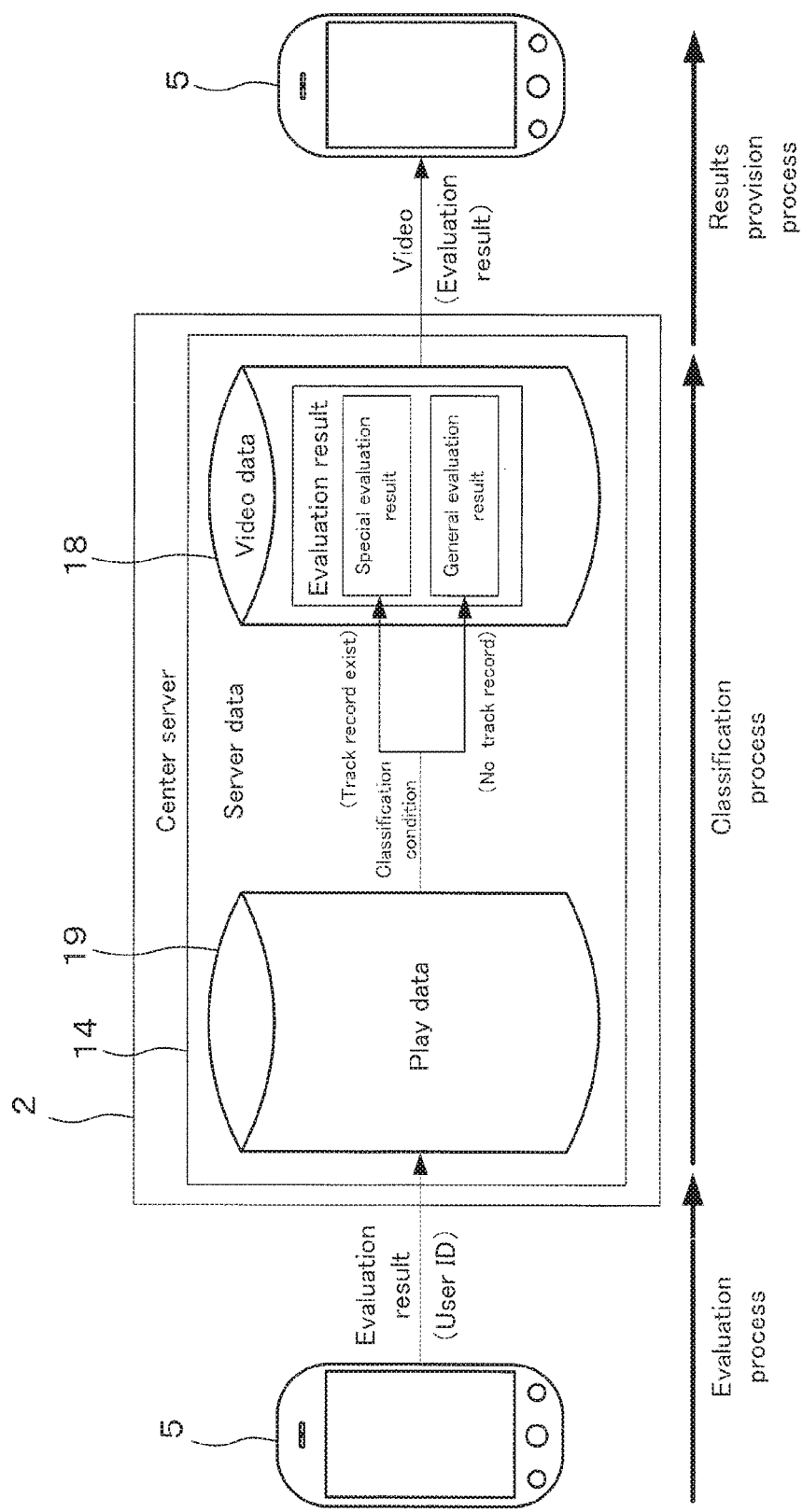
FIG. 3 is an explanatory figure for explanation of a summary of an example of a video evaluation service.

A summary of an example of the video evaluation service will now be explained in concrete terms with reference to FIGS. 3 and 4. FIG. 3 is an explanatory figure for explanation of a summary of an example of the video evaluation service. As shown in FIG. 3, the video evaluation service includes an evaluation process, a classification process, and a results provision process. In the evaluation process, the evaluation results by the users for the videos are accepted via the user terminals 5. In the classification process, the evaluation results by the users are classified into special evaluation results and general evaluation results on the basis of a classification condition. And, in the results provision process, the special evaluation results and the general evaluation results are supplied to the users via the user terminals 5, in such a manner that they can be mutually distinguished from one another.

In concrete terms, in the evaluation process, the results of evaluations by the various users are transmitted from the user terminals 5 to the center server 2. For example, the user terminals 5 may accept the evaluation results via video applications (software) for providing the video replay function. For example, a web browser application (hereinafter sometimes termed a "web browser") may be used as a video application of this sort. In other words, in the evaluation process, input and transmission of the evaluation results may be executed via a web application. Moreover, a web application of this sort may request user IDs for accepting evaluation results. And, along with the evaluation results, the user terminals 5 may transmit to the center server 2 the user IDs of the people who have performed the evaluations, via a web application of this sort. Incidentally, the evaluation process may be provided at an appropriate timing, such as during of the video in question, after viewing of the video, or the like.

As required conditions, the classification condition may, for example, include a track record of viewing videos, a track record of evaluations, attributes of the person performing the evaluation, and, in the case of a game video, an activity track record of a game corresponding to that game video. For example, information as to whether or not the video has been viewed to the end, or as to whether or not the same video has been viewed several times, may be employed as the viewing track record. Furthermore, for example, the presence or absence of evaluation track records for other videos (including evaluation track records for specific videos such as videos that are associated with the video which is the subject of evaluation, or the like) may be employed as the evaluation track record. In a similar manner, whether the person performing the evaluation is of a predetermined sex, whether or not the person is of a predetermined age, whether or not the person's address is within a predetermined range, and so on may be employed as attributes of that person. Furthermore, as the activity track record, the presence or absence of a playing track record (the details of having reached a predetermined level or degree of progression or the like may be further employed as a required condition) in the game that corresponds to the game video or in an associated game (in the case of a series of games, in a previously played game or in another game with common characters or the like) or user associations in the game (such as friend setting relationships, rival setting relationships, and so on) may be employed.

For example, if the classification condition includes an activity track record in the required conditions, then, in the classification process, the center server 2 classifies the evaluation results of each user for game videos into special evaluation results and general evaluation results on the basis of the play data 19. In concrete terms, if the evaluation results for a game video are supplied from a user having a playing track record in the game that corresponds to that game video, then the center server 2 classifies those evaluation results as being special evaluation results. On the other hand, if those evaluation results are supplied from a user who has no playing track record in that game, then the center server 2 classifies those evaluation results as being general evaluation results. In other words, based upon the user ID, the center server 2 refers to information about the activity track record in the play data 19, and classifies these evaluation results as special evaluation results if the user ID is associated with a playing track record in the corresponding game, while classifying these evaluation results as general evaluation results if the user ID is not associated with any playing track record in that game. Moreover, the center server 2 manages these classification results. For example, the video data 18 may be employed for management of this type. In other words, for example, via the video data 18, the center server 2 may manage the evaluation results for the videos while distinguishing between special evaluation results and general evaluation results. In this case, the special evaluation results and the general evaluation results respectively correspond to the "one partial category" and to the "other category" of the present invention. Furthermore, the evaluation results belonging to these classifications respectively correspond to the "special evaluation results" and to the "other evaluation results" of the present invention.

In the results provision process, the center server 2 provides at least the special evaluation results to the user terminals 5, so that the special evaluation results can be distinguished from the general evaluation results. In concrete terms, for example, in order to implement this kind of distinction, the center server 2 may extract and provide only the special evaluation results, or may provide both the special evaluation results and also the general evaluation results after having edited their worths. Moreover, for example, the center server 2 may provide both the special evaluation results and also the general evaluation results to the user terminals 5, so that this type of distinction may be executed by the user terminals 5. In other words, provided that the special evaluation results are displayed upon the user terminals 5 in such a way as to be distinguished from the general evaluation results, the special evaluation results and the general evaluation results may be provided to the user terminals 5 before or after they have been distinguished from one another.

Furthermore, when editing is being performed so that the worth of the evaluation results belonging to the special evaluation results becomes higher than the worth of the evaluation results belonging to the general evaluation results, then either one of the special evaluation results and the general evaluation results may be edited, or both of them may be edited. For example, only the special evaluation results may be multiplied by a coefficient that is greater than unity, so that their worths increase; or only the general evaluation results may be multiplied by a coefficient that is less than unity, so that their worths decrease. Or, both the special evaluation results and the general evaluation results may be multiplied by appropriate coefficients, so that the above effects are combined.

Figure 4:
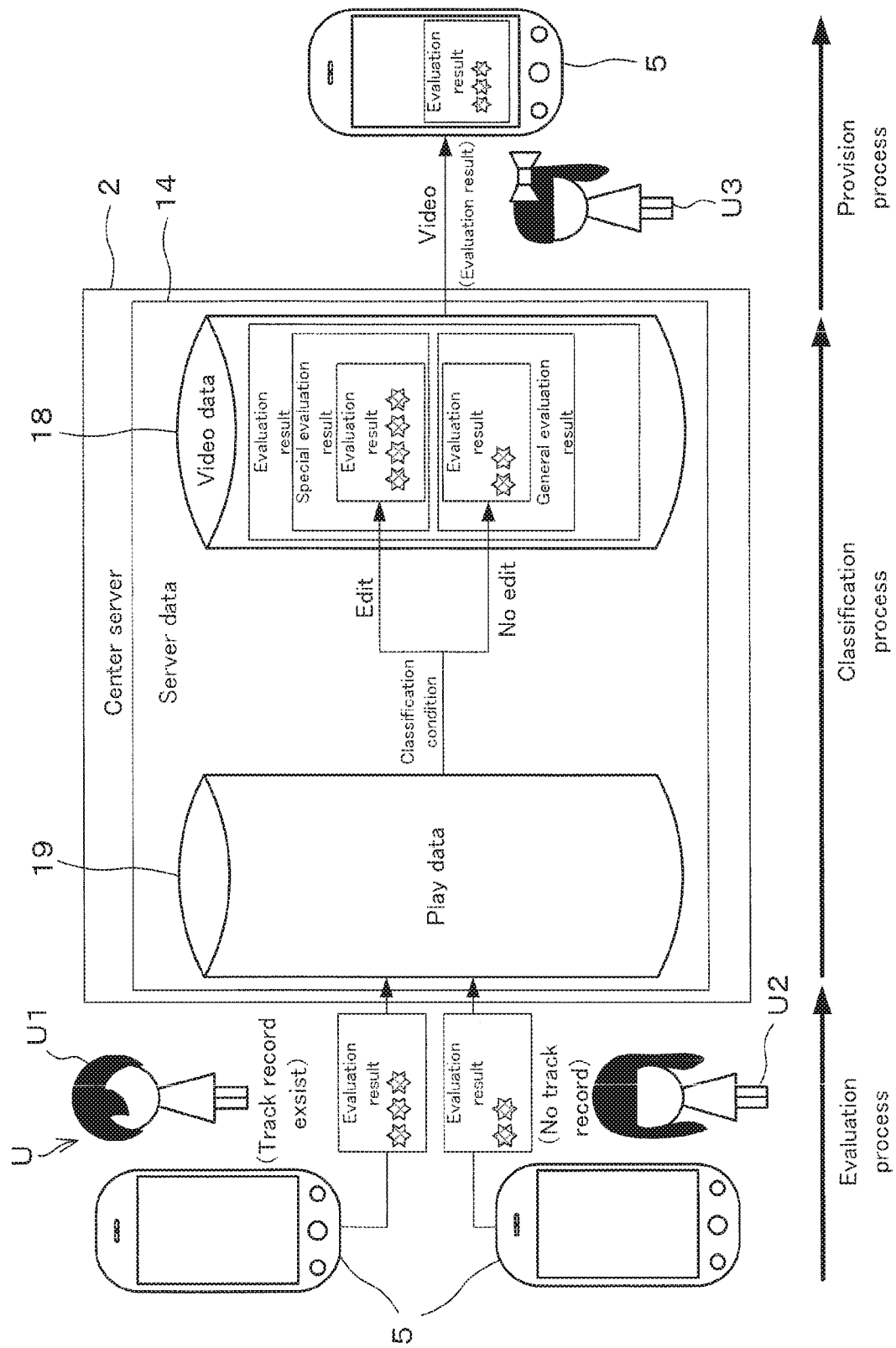
FIG. 4 is an explanatory figure for explanation of a summary of an example of the video evaluation service when editing is performed so that the worths of evaluation results that belong to special evaluation results are increased.

FIG. 4 is an explanatory figure for explanation of a summary of an example of the video evaluation service when editing is performed so that the worths of evaluation results that belong to the special evaluation results are increased. Moreover, the example of FIG. 4 shows a case in which, in a similar manner to the example of FIG. 3, the classification condition includes an activity track record in the required conditions. Furthermore, the example of FIG. 4 shows a case in which each video is evaluated in terms of a number of stars (i.e. this is a case in which each user awards a number of stars to each video, indicating the results of evaluation). And the example of FIG. 4 shows a case in which, as the evaluations of videos, total numbers of stars corresponding to the result of totaling all such evaluation results are supplied to users U. In a case of this type, as shown in FIG. 4, the evaluation results belonging to the special evaluation results are edited so that the worths of the evaluation results belonging to the special evaluation results become higher than the worths of the general evaluation results, and the evaluation results after this type of editing are supplied to the viewers.

In concrete terms, in the example of FIG. 4, in the evaluation process, among the users who have viewed a game video, a first user U1 who has a track record of playing the game that corresponds to that game video awards three stars ("*") as an evaluation result for that game video, while a second user U2 who has no such track record awards two stars ("") to the game video. In this case, evaluation results of this sort are transmitted to the center server 2 from the user terminals 5 of the first user U1 and the second user U2.

Next in the classification process, on the basis of the classification condition, the center server 2 determines whether or not editing is required, and performs editing if it is required. In concrete terms, first, while referring to the play data 19 on the basis of the user ID, in the case of the evaluation results that have been supplied by a user U having a playing track record, the center server 2 classifies those as being special evaluation results. And the center server 2 determines that special evaluation results of this type need to be edited, and multiplies the evaluation results by a predetermined coefficient, so that the number of stars increases. For example, 1.3 may be employed as this sort of predetermined coefficient (if the number of stars after multiplication does not correspond to an integer, it may be converted to an integer by rounding off, for example). In other words, the center server edits the evaluation results of the first user U1 by increasing the number of stars thereof by about 30%, so that the number of stars becomes four. And then the center server manages the evaluation results after editing with the video data 18. Incidentally, information indicating that the evaluation results belong to the special evaluation results may be managed with the video data 18, or may not be so managed. Furthermore, when evaluation is performed by a plurality of users U, multiplication by the predetermined coefficient may be performed upon the total accumulated value of the special evaluation results, or may be performed upon each evaluation result belonging to the special evaluation results. In other words, the cumulative value of the evaluation results before editing may be managed, and multiplication by the predetermined coefficient may be performed upon this cumulative value at the time that it is provided. Alternatively, the multiplication by the predetermined coefficient may be performed each time when classification is performed, and the cumulative value after editing may be managed.

On the other hand, in the case of evaluation results that have been supplied by a user U having no playing track record, the center server 2 classifies those as being general evaluation results. And the center server 2 determines that editing of general evaluation results of this type is not necessary, and manages these evaluation results just as they are via the video data, without editing them. In other words, the center server 2 manages the number of stars that indicates two as being the evaluation result of the second user U2 just as they are, using the video data 18.

And, in the results provision process, the evaluation results after editing are provided to the user U (i.e. to the viewer) who is viewing the evaluation results for each video via a totaled value of all the evaluation results. In other words, the evaluation results after editing are provided to each user U via a totaled value that includes them. For example, as such an evaluation result, the average value of the evaluation results after editing, or the mode value, or the highest value, may be provided. In the FIG. 4 example, in the results provision process, information indicating three stars as being the evaluation result for the game video, in other words information indicating the average value of all the evaluation results including the evaluation results after editing, is provided to the user terminal 5 of the third user U3. The video evaluation service may be adapted to provide evaluation results for game videos to users while performing editing for enhancing the worth of the special evaluation results in this manner.

Incidentally, the evaluation results after editing are not limited to following the format described above; they may be provided in various other ways. For example, if the video data 18 includes information that distinguishes between the special evaluation results and the general evaluation results, then the evaluation results after editing may be provided in some appropriate format whose subject is only the special evaluation results, such as statistic results (such as the average value or the like), extraction results, sort results, and so on.

Figure 5:
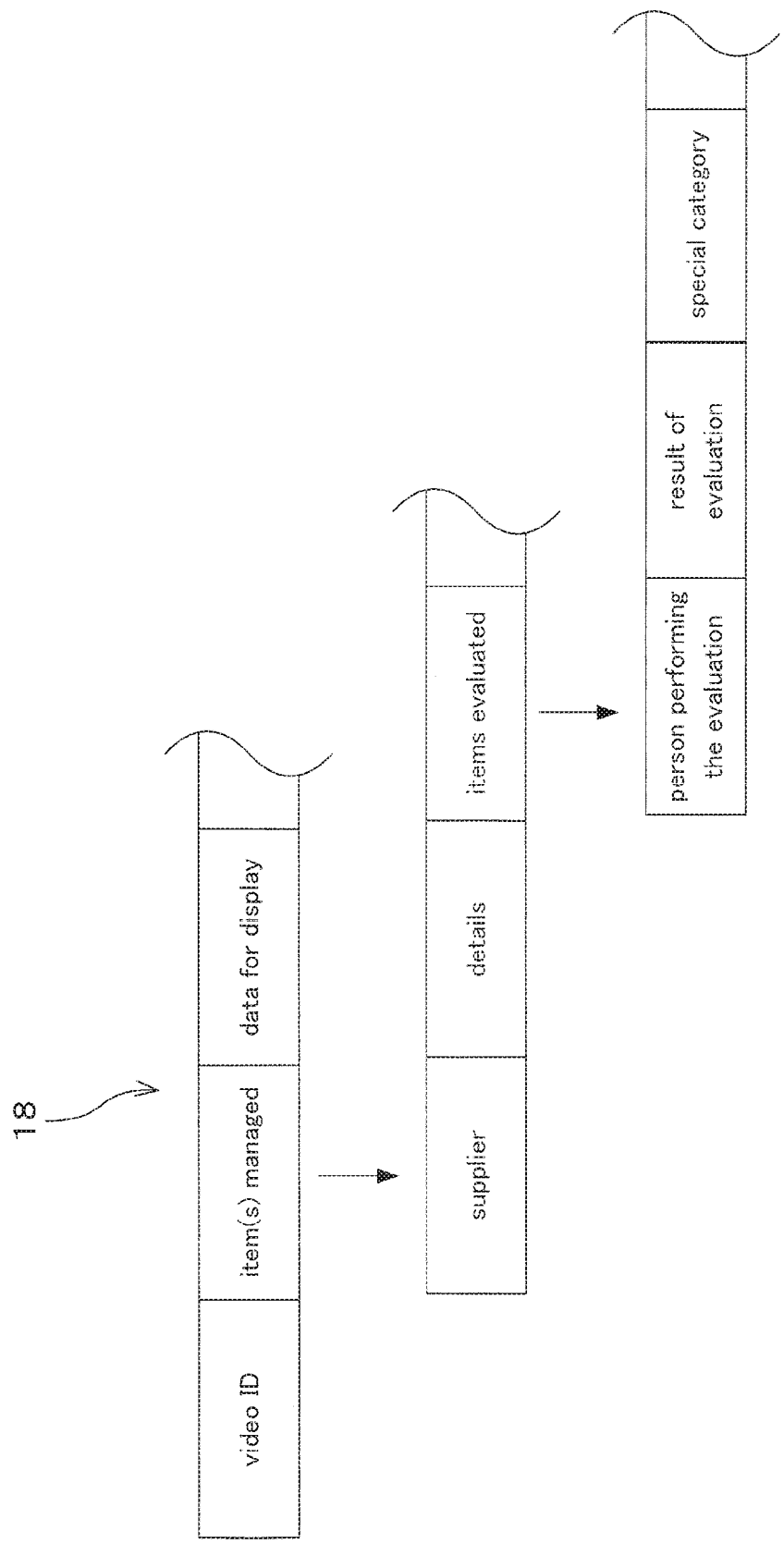
FIG. 5 is an explanatory figure for explanation of an example of details of video data.

Next, the details of the video data 18 and the play data 19 will be explained. FIG. 5 is an explanatory figure for explanation of an example of the details of the video data 18. Moreover, the example of FIG. 5 shows a case in which the video data 18 is employed for management of the evaluation results. In this case, as shown in FIG. 5, the video data 18 may for example include the information items "video ID", "item(s) managed", and "data for display". And the video data 18 may, for example, consist of a set of records that are structured so that these information items are mutually associated.

"Video ID" is an information item for identifying each video. Information specifying a unique video ID for each video may, for example, be employed as "video ID". Moreover, "data for display" is data (for example MPEG standard data) that is required for displaying each video upon the monitor MO. On the other hand, "item(s) managed" is information for managing the videos. For example, "item(s) managed" may include the information items "supplier", "details", and "items evaluated".

"Supplier" is an information item specifying the user U who supplied each video. For example, information specifying the user ID corresponding to the user U who uploaded each video may be employed as the information item "supplier". And "details" is information specifying various characteristics of the video. For example, information specifying the sex or the age of the subject being viewed, or specifying the classification to which each video belongs, may be employed as "details". Furthermore, for example, in the case of a game video, information specifying the situation in the game (for example its degree of progression), or the characters appearing in the video, or the level of the user U who was playing (in the case of a game video, for example), or the like may be employed as "details".

"Items evaluated" is information for managing the evaluation results of each of the users U for each of the videos. "Items evaluated" may, for example, include the information items "person performing the evaluation", "result of evaluation", and "special category". "Person performing the evaluation" is information specifying the user U who evaluated each video. For example, information specifying the user ID corresponding to the user U who evaluated each video may be employed as the information item "person performing the evaluation". And "result of evaluation" is information specifying the result of evaluation by each of the users U. For example, if each video is evaluated by a number of stars, then a numerical value that specifies the number of stars may be employed as "results of evaluation". And "special category" is information for determining whether or not this evaluation result corresponds to a special evaluation result. For example, a flag that indicates a special evaluation result may be employed as the information item "special category". Furthermore, "special category" may be employed when whether or not the result corresponds to a special evaluation result is managed by the video data 18.

Figure 6:
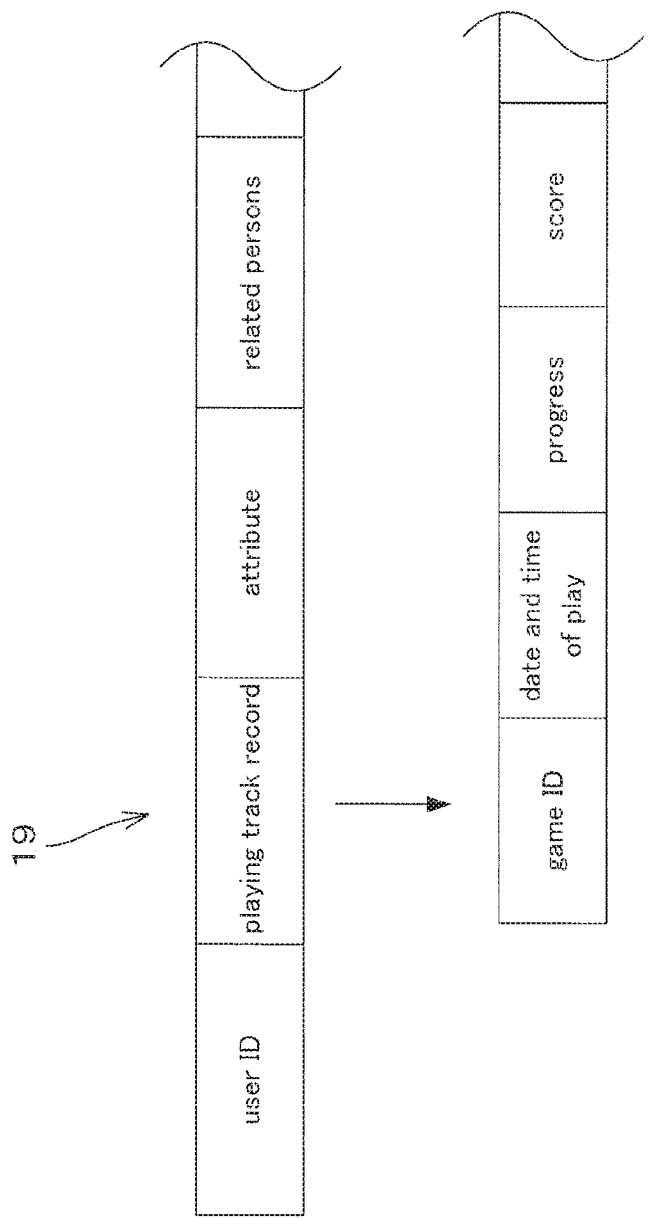
FIG. 6 is an explanatory figure for explanation of an example of details of play data.

On the other hand, FIG. 6 is an explanatory figure for explanation of an example of the details of the play data 19. As shown in FIG. 6, the play data 19 may, for example, include the information items "user ID" serving as user identification information, "playing track record", "attribute", and "related persons". And the play data 19 may, for example, consist of a set of records that are constructed so that these information items are mutually associated. In this case, for example, the information items "playing track record" and "related persons" may function as information related to the activity track record. Furthermore, for example, information resulting from adding "attributes" to the information about the activity track record may function as unique information.

"User ID" is user ID information for identifying each of the users U. And "attributes" is information specifying the attributes of each of the users U. For example, information specifying sex or age may be employed as "attribute" information. And "related persons" is information specifying other users U with whom association is set. For example, the information item "related persons" may be employed when association setting for establishing association between users U is permitted in the game. And association between users U may be set via association setting of this type. Moreover, for example, friend registration or rival registration or the like may be employed as association setting of this type. Furthermore, for example, information specifying the user IDs of other users U with whom friend registration or the like of this type is established may be employed as the information item "related persons".

Incidentally, association settings may be established for each game. In other words, an information item "related persons" may be associated with each information item "game ID". Moreover, with the video distribution system 1, user IDs of a plurality of types that are managed by different systems may be employed. In concrete terms, for example, the user IDs that are employed by web browsers and the user IDs that are employed by game applications may be of different types (management systems and so on). In other words, different user IDs corresponding to the same user may be employed by a web browser and by a game application. And this type of association between user IDs may, for example, be managed by ID management data. Due to this, for example, different types of user ID information may be employed in the item "user ID" of the play data 19 and in the item "supplier" of the video data 18.

On the other hand, the item "playing track record" is information specifying the playing track record of the game. For example, "playing track record" may include information items "game ID", "date and time of play", "progress", and "score". And "game ID" is an information item that specifies a unique game ID for each game, in order to identify each game when there are a plurality of games. Moreover, "date and time of play" and "score" are information items that respectively specify the date and time at which the game was played, and the score at that time. On the other hand, "progress" is an information item that specifies the degree of progression in the game. For example, if a numerical value that indicates the degree of progression in the game is set at appropriate times during the game, then information specifying a numerical value of this type may be employed as the information item "progress".

Next, results classification processing and results provision processing will be explained. The results classification processing is processing for classifying the evaluation results by each user U for each video into a plurality of categories on the basis of the classification condition. For example, the results classification processing may be adapted to implement the classification process of the example of FIG. 3 or FIG. 4. On the other hand, the results provision processing is processing for providing the evaluation results for videos to the users U. For example, the results provision processing may be adapted to implement the results provision process of FIG. 3 or FIG. 4.

Figure 7:
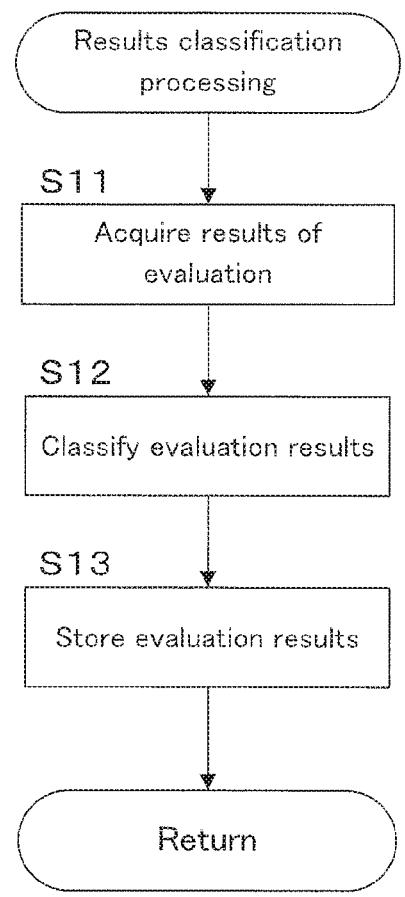
FIG. 7 is a figure showing an example of a flow chart of a results classification processing routine.
Figure 8:
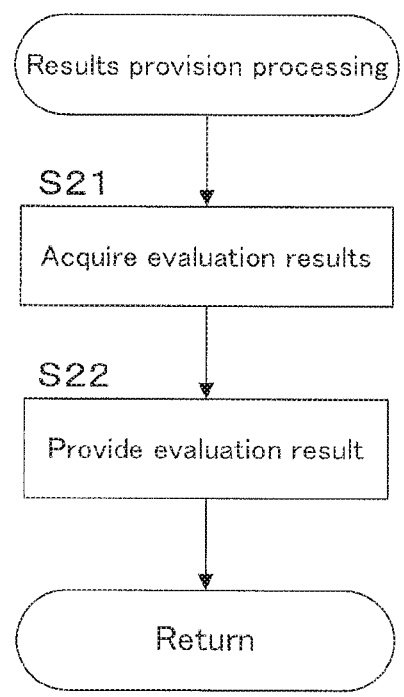
FIG. 8 is a figure showing an example of a flow chart of a results provision processing routine.

The results classification processing is performed by the control unit 10 of the center server 2 via the routine of FIG. 7, and the results provision processing is performed by the control unit 10 via the routine of FIG. 8. In more concrete terms, for example, the routines of FIGS. 7 and 8 may be executed by the web service management unit 17 of the control unit 10. Also, apart from the above processing, the control unit 1 of the center server 2 and the control units 30 of the user terminals 5 may perform per se conventional processing of various types, either singly or in mutual cooperation. However, detailed explanation thereof will be omitted.

FIG. 7 is a figure showing an example of a flow chart of a results classification processing routine for implementing the results classification processing. For example, the routine of FIG. 7 may be executed each time an evaluation result is transmitted via a user terminal 5. When the routine of FIG. 7 is started, first in a step S11 the web service management unit 17 acquires the results of evaluation by each of the users U. This acquisition may, for example, be performed on the basis of the results of transmission from the user terminals 5. Furthermore, for example, if the classification condition includes a playing track record as a required condition, then in step S11 the web service management unit 17 may further acquire the user IDs.

Next, in a step S12, the web service management unit 17 classifies the evaluation results acquired in step S11 on the basis of the classification condition. For example, if the classification condition includes the presence of a playing track record as a required condition, then this classification may be implemented on the basis of whether or not the user U who has provided the evaluation results for the game video possesses a playing track record in the game corresponding to this game video. In concrete terms, for example, the web service management unit 17 may refer to the play data 19, and may classify the evaluation results as being special evaluation results if the user U possesses a playing track record in the game corresponding to the game video in the user ID acquired in step S11, while classifying the evaluation results as being general evaluation results if the user U possesses no such playing track record.

Furthermore, for example, the web service management unit 17 may edit the evaluation results if the worths of the special evaluation results are being managed to be higher than the worths of the general evaluation results. In concrete terms, for example, when performing editing for enhancing the worth of a special evaluation result as this kind of editing, the web service management unit 17 may perform processing in step S12 to multiply that special evaluation result by a predetermined coefficient.

In the next step S13, the web service management unit 17 stores the evaluation results while reflecting the results of processing in step S12. In concrete terms, for example, the web service management unit 17 may store the evaluation results by recording them in the video data 18. Moreover, for example, if the evaluation results after editing and the categories to which the evaluation results belong are managed via the video data 18, then the evaluation results after editing and the category of this type may be recorded in the video data 18 as the result of the processing of step S12. In other words, in step S13, the web service management unit 17 may, for example, update the video data 18 so that the evaluation results after editing (if the evaluation results is edited) and the categories to which these evaluation results belong are managed. And, when the processing of step S13 is completed, the web service management unit 17 terminates this iteration of the routine.

According to the routine of FIG. 7, the results of evaluation by each user U are classified into a plurality of categories and are managed on the basis of the classification condition. Moreover, if the evaluation results are edited on the basis of the classification condition, then the evaluation results after editing of this type are managed. To put it in another manner, the classification process of the example of FIG. 3 or of FIG. 4 is implemented.

On the other hand, FIG. 8 is a figure showing an example of a flow chart of a results provision processing routine for implementing the results provision processing. The evaluation results may, for example, be provided via a viewing screen for viewing videos, or may be provided via a dedicated screen. Due to this, for example, the routine of FIG. 8 may be executed when display of the viewing screen or of the dedicated screen is requested from a user terminal 5.

When the routine of FIG. 8 is started, first in a step S21 the web service management unit 17 acquires the evaluation results corresponding to the video that is the subject of being displayed. For example, if the evaluation results are managed with the video data 18, then the web service management unit 17 may implement acquisition of this sort by acquiring the video data 18 so as to include information specifying evaluation results of this type.

In the next step S22, the web service management unit 17 provides the evaluation result that have been acquired in step S21 to the user terminal 5. For example, the web service management unit 17 may implement supply of this sort by supplying the video data 18 that was acquired in step S21 to the user terminal 5, so that the viewing screen or the dedicated screen is displayed upon the user terminal 5. Moreover if, as the evaluation results, only the special evaluation results are being requested, then the web service management unit 17 may extract and provide only the special evaluation results. In other words, the web service management unit 17 may generate video data 18 in which the evaluation results have been restricted to the special evaluation results, and may provide video data 18 of this type to the user terminal 5. On the other hand, if for example the cumulative values of the special evaluation results before editing are managed by numbers of stars or the like, then the web service management unit 17 may perform editing by multiplying these cumulative values by a predetermined coefficient, and may provide the results of this editing to the user terminal 5. In this case, the total values of the special evaluation results and of the general evaluation results based upon the evaluation results after editing may be supplied to the user terminal 5. And, when the processing of step S22 is completed, the web service management unit 17 terminates this iteration of the routine.

The routine shown in FIG. 8 is provided to the user terminals 5 so that the evaluation results belonging to the various classifications are separated from one another. In concrete terms, for example, if the evaluation results are edited so as to enhance the worths of the special evaluation results, then the evaluation results after editing, in other words the evaluation results that are distinguished so that the worths of the special evaluation results become higher than the worths of the general evaluation results are supplied to the user terminals 5. Or, for example, only the special evaluation results may be extracted and supplied to the user terminals 5, so that they are distinguished from the general evaluation results. In other words, the results provision process of the example of FIG. 3 or of FIG. 4 is implemented.

As explained above, according to this embodiment, the evaluation results of videos are classified into a plurality of categories on the basis of a classification condition, and are provided to the users U so that each category can be distinguished. For example, if the classification condition includes an activity track record as a required condition, then the evaluation records for game videos are classified into a plurality of categories on the basis of activity track record. In concrete terms, the evaluation results of a game video are classified into special evaluation results and general evaluation results on the basis of activity track records associated with that game, and these are provided so as to be separated from one another. Since, due to this, it is possible to reflect the game activity track records in the evaluation results for the game video, accordingly, for example, it is possible to treat the worths of evaluation results provided by users U who are deeply associated with the game as being higher than the worths of evaluation results provided by other users U.

In the case of a game video, it is often the case that results of evaluation by users U who are deeply associated with the game corresponding to that video are more useful than the results of evaluation by other users U. In concrete terms, for example, it is often the case that a game video is viewed by a user U who plays the game corresponding to that video, or by a user U who wishes to play that game. For this reason, it is often the case that the results of evaluation by a user U who has experience of playing the game (for example, a first user U1) are more valuable than the results of evaluation by a user U who has no such play experience (for example, a second user U2). Due to this, if for example the special evaluation results and the general evaluation results are distinguished by editing in which the evaluation results belonging to the special evaluation results are multiplied by a predetermined coefficient, then, since the worths of the special evaluation results are increased relative to the worths of the general evaluation results, accordingly it is possible to enable a user U (for example, a third user U3) to accord more importance to those evaluation results whose usefulness is higher, over the other evaluation results. Or, if only the special evaluation results are provided to the users U, then it is possible further to enhance the usefulness (or the reliability) of the evaluation results, since it is possible to provide the results of evaluation of the game video to the users U while restricting them only to evaluation results whose usefulness is high. As a result, it is possible to enhance the usefulness (or the reliability) of the evaluation results for a game video by reflecting the activity track records in the evaluation results. And, due to this, it is possible to promote viewing of game videos or utilization of games.

In the above embodiment, by performing the routine of FIG. 7, the control unit 10 of the center server 2 functions as the result classification unit of the present invention. Moreover, in a similar manner, by performing the routine of FIG. 8, the control unit 10 of the center server 2 functions as the result provision unit of the present invention. On the other hand, by storing the play data 19, the storage unit 11 of the center server 2 functions as the activity data storage unit of the present invention.

The present invention is not limited to the embodiment described above; it may be varied as appropriate. For example, in the embodiment described above, the user terminals 5 function both as video display terminals and as game terminals, according to differences in their software. However, the present invention is not limited to this type of format. For example, it may be arranged for the user terminals 5 to function either as video display terminals or as game terminals, according to differences in their hardware. In other words two separate user terminals 5, such as for example a personal computer and a tablet, may function as a video display terminal and as a game terminal, respectively. Furthermore, for example, apart from the user terminals 5, game machines for business use (i.e. for commercial use) that enable users to play games within a predetermined range for payment or without payment, and that thus serve as game terminals, may be connected to the center server 2 via the network 3. Moreover, in this case, game machines of this type may also be used as dedicated game terminals.

In the following, examples of the present invention are described that are obtained from the details described above. Incidentally, in order to facilitate understanding of the present invention, reference symbols in parentheses that refer to the appended figures are supplemented in the following explanation, but the present invention is not thereby to be considered as being limited to the embodiments shown in the figures.

The server device (2) of the present invention is a server device that comprises a computer (10) to which video display terminals (5) that display videos on the basis of video data (18) are connected via a network, and that, when videos are evaluated by users (U) via the video display terminals, manages results of evaluations by the users, wherein the computer serves as: an activity data storage unit (11) that, when a game video associated with a game supplied by a game terminal (5) connected via the network (3) is displayed upon a video display terminal on the basis of the video data, stores activity data (19) in which are described, in mutual association, information about activity track records related to users in that game, and user identification information for identifying the users; a result classification unit (10) that, on the basis of the activity track record information in the activity data, classifies the results of evaluations by the users into a plurality of categories that include one partial category and another category, so that special evaluation results that correspond to evaluation results belonging to the one partial category are distinguished from other evaluation results that correspond to evaluation results belonging to the other category; and a result provision unit (10) that provides evaluation results to the users on the basis of results of classification by the result classification unit, so as to include the special evaluation results.

According to the present invention the results of evaluations of a game video are classified into the special evaluation results and the other evaluation results on the basis of activity track records relating to that game, and are provided so that they can be distinguished from one another. Due to this, it is possible to reflect the game activity track records in the game video evaluation results. Thus, for example, it is possible to manage the worths of evaluations by users who are deeply associated with the game to be higher than the worths of evaluation results by other users. And, in the case of a game video, it is often the case that the evaluation results by users who are deeply associated with the corresponding game are more useful than the evaluation results by other users. In concrete terms, for example, it is often the case that a game video is viewed by users who play the game that corresponds thereto, or by users who wish to play that game. Due to this, it is often the case that the results of evaluations by users who have experience of playing the game are more beneficial than the results of evaluations by users who have no such playing experience. As a result, it is possible to enhance the usefulness (or the reliability) of the results of evaluation of a game video by reflection of activity track records in the evaluation results.

Track records of various types may be employed as activity track records. For example, playing track records of the game (including the details of level of progression and so on), or playing track records of related games (in the case of a series of games, previous games or other games that have common characters or the like), or associations in the game with users (relationships with friend settings or relationships with rival settings and so on), or the like may be thus employed as activity track records. In concrete terms, for example, according to one aspect of the server device of the present invention, on the basis of information of the activity track records, the result classification unit may classify the result of an evaluation by a user (U1) who has a playing track record of in the game into the one partial category, and classifies the result of an evaluation by a user (U2) who does not have the playing track record into the other category, respectively.

Furthermore, the special evaluation results and the other evaluation results may be distinguished from one another in various different ways. For example, according to one aspect of the server device of the present invention, editing may be performed upon at least one of the special evaluation results and the other evaluation results in order to enhance the worths of the special evaluation results above the worths of the other evaluation results, so that the special evaluation results are distinguished from the other evaluation results. In this case, since the worths of the special evaluation results are elevated to be higher than the worths of the other evaluation results, accordingly it is possible to make the user accord higher consideration to the evaluation results whose usefulness is high, than to the other evaluation results.

Yet further, the special evaluation results may be provided to the users in various different ways. For example, if the special evaluation results can be integrated with the other evaluation results, then they may be provided via such integrated evaluation results. Alternatively, the special evaluation results may be provided separately form the other evaluation results. In concrete terms, for example, according to one aspect of the server device of the present invention, if the worths of the special evaluation results and the other evaluation results are expressed numerically, the result provision unit may provide the results of evaluation by each user so as to include the special evaluation results, by providing total worth results of the other evaluation results and the worths of the special evaluation results after editing. In this case, the other evaluation results can also be employed. Or, as the results of evaluation by the users, the result provision unit may extract and provide only the special evaluation results. In this case, it is possible further to enhance the usefulness (or the reliability) of the evaluation results, since it is possible to provide the evaluation results of game videos to the user while focusing upon the special evaluation results, whose usefulness is high.

On the other hand, a non-transitory computer readable storage medium according to the present invention is a non-transitory computer readable storage medium storing a computer program that is adapted to cause the computer (10) having the activity data storage unit to function as the units of the server device described above. By executing the computer program of the present invention, it is possible to implement the server device of the present invention.

The invention claimed is:

1. A server device that comprises a computer to which video display terminals that display videos based on video data are connected via a network, and that, when videos are evaluated by users via the video display terminals, manages results of evaluations by the users, and wherein the computer serves as:
   an activity data storage unit that, when a game video associated with a game supplied by a game terminal connected via the network is displayed upon a video display terminal based on the video data, stores activity data in which are described, in mutual association, activity track record information related to users in the game, and user identification information for identifying the users;
   a result classification unit that, based on the activity track record information in the activity data, classifies the results of evaluations by the users into a plurality of categories that include one partial category and another category, so that special evaluation results that correspond to evaluation results belonging to the one partial category are distinguished from other evaluation results that correspond to evaluation results belonging to the another category; and
   a result provision unit that provides evaluation results to the users based on results of classification by the result classification unit, so as to include the special evaluation results,
   wherein the special evaluation results are expressed as first numeric values and the other evaluation results are expressed as second numeric values, and
   wherein the computer edits at least one of the special evaluation results and the other evaluation results by performing at least one of multiplying the first numeric values by a first coefficient and multiplying the second numeric values by a second coefficient to distinguish the special evaluation results from the other evaluation results.

2. The server device according to claim 1, wherein, based on the activity track record information, the result classification unit classifies a result of an evaluation by a user who has a playing track record in the game into the one partial category, and classifies a result of an evaluation by a user who does not have the playing track record into the another category, respectively.

3. The server device according to claim 1, wherein, as the results of evaluation by the users, the result provision unit extracts and provides only the special evaluation results.

4. The server device according to claim 1, wherein the special evaluation results are visually distinguished from the other evaluation results.

5. A server device that comprises a computer to which video display terminals that display videos based on video data are connected via a network, and that, when videos are evaluated by users via the video display terminals, manages results of evaluations by the users, and wherein the computer serves as:
  an activity data storage unit that, when a game video associated with a game supplied by a game terminal connected via the network is displayed upon a video display terminal based on the video data, stores activity data in which are described, in mutual association, activity track record information related to users in the game, and user identification information for identifying the users;
  a result classification unit that, based on the activity track record information in the activity data, classifies the results of evaluations by the users into a plurality of categories that include one partial category and another category, so that special evaluation results that correspond to evaluation results belonging to the one partial category are distinguished from other evaluation results that correspond to evaluation results belonging to the another category; and
  a result provision unit that provides evaluation results to the users based on results of classification by the result classification unit, so as to include the special evaluation results,
  wherein the special evaluation results are expressed as first numeric values and the other evaluation results are expressed as second numeric values, and
  wherein editing is performed upon at least one of the special evaluation results and the other evaluation results by performing at least one of multiplying the first numeric values by a first coefficient and multiplying the second numeric values by a second coefficient to distinguish the special evaluation results from the other evaluation results.

6. The server device according to claim 5, wherein the result provision unit provides the results of evaluation by each user so as to include the special evaluation results, by providing total numerical value of the other evaluation results and the numerical value of the special evaluation results after editing.

7. A non-transitory computer readable storage medium storing a computer program that is adapted to cause a computer to function as:
  an activity data storage unit that, when a game video associated with a game supplied by a game terminal connected via a network is displayed upon a video display terminal based on video data, stores activity data in which are described, in mutual association, activity track record information related to users in the game, and user identification information for identifying the users;
  a result classification unit that, based on the activity track record information in the activity data, classifies results of evaluations by the users into a plurality of categories that include one partial category and another category, so that special evaluation results that correspond to evaluation results belonging to the one partial category are distinguished from other evaluation results that correspond to evaluation results belonging to the another category; and
  a result provision unit that provides evaluation results to the users based on results of classification by the result classification unit, so as to include the special evaluation results,
  wherein the special evaluation results are expressed as first numeric values and the other evaluation results are expressed as second numeric values, and
  wherein the computer program is adapted to cause the computer to edit at least one of the special evaluation results and the other evaluation results by performing at least one of multiplying the first numeric values by a first coefficient and multiplying the second numeric values by a second coefficient to distinguish the special evaluation results from the other evaluation results.

* * * * *